United States Patent
Tas et al.

(10) Patent No.: US 11,505,699 B2
(45) Date of Patent: Nov. 22, 2022

(54) POLY(ARYLENE ETHER) COPOLYMER

(71) Applicant: SABIC Global Technologies B.V, Bergen op Zoom (NL)

(72) Inventors: Huseyin Tas, Selkirk, NY (US); Eylem Tarkin-Tas, Selkirk, NY (US); Alvaro Carrillo, Selkirk, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 456 days.

(21) Appl. No.: 16/434,715

(22) Filed: Jun. 7, 2019

(65) Prior Publication Data

US 2020/0109281 A1    Apr. 9, 2020

(30) Foreign Application Priority Data

Oct. 8, 2018 (EP) .................................. 18199174

(51) Int. Cl.
| | |
|---|---|
| C08L 71/12 | (2006.01) |
| C08G 65/44 | (2006.01) |
| C09D 171/12 | (2006.01) |
| C09J 171/12 | (2006.01) |
| C09K 3/10 | (2006.01) |
| C08J 5/24 | (2006.01) |
| C08G 101/00 | (2006.01) |

(52) U.S. Cl.
CPC ............ *C08L 71/123* (2013.01); *C08G 65/44* (2013.01); *C08J 5/24* (2013.01); *C09D 171/12* (2013.01); *C09J 171/12* (2013.01); *C09K 3/10* (2013.01); C08G 2101/00 (2013.01); C08J 2371/12 (2013.01); C08L 2203/12 (2013.01); C08L 2203/14 (2013.01); C09K 2200/0657 (2013.01)

(58) Field of Classification Search
None
See application file for complete search history.

(56) References Cited

U.S. PATENT DOCUMENTS

| | | | |
|---|---|---|---|
| 5,068,310 A | 11/1991 | Shaffer | |
| 7,541,421 B2 | 6/2009 | Carrillo et al. | |
| 2006/0160982 A1* | 7/2006 | Ishii | C07C 43/295 528/86 |
| 2007/0106051 A1 | 5/2007 | Carrillo et al. | |
| 2007/0135609 A1 | 6/2007 | Carrillo et al. | |
| 2008/0246173 A1 | 10/2008 | Braidwood et al. | |
| 2011/0152471 A1 | 6/2011 | Kamalakaran et al. | |
| 2015/0038667 A1 | 2/2015 | Carrillo et al. | |

FOREIGN PATENT DOCUMENTS

| | | |
|---|---|---|
| EP | 0476270 A1 * | 3/1992 |
| EP | 1642918 A1 | 4/2006 |
| JP | 2012082343 A | 4/2012 |
| WO | 2007067669 | 6/2007 |
| WO | 2017105682 A1 | 6/2017 |

OTHER PUBLICATIONS

EP Third Party Submission Issued Feb. 19, 2021 in EP Application No. 18199174.6, p. 1-118.

* cited by examiner

*Primary Examiner* — Tae H Yoon
(74) *Attorney, Agent, or Firm* — Cantor Colburn LLP

(57) ABSTRACT

A poly(arylene ether) copolymer is the product of oxidative copolymerization of monomers including a monohydric phenol and a dihydric phenol of the formula

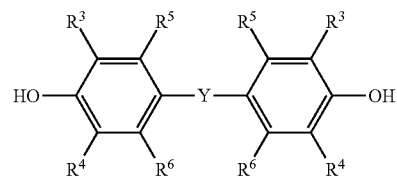

wherein $R^3$, $R^4$, $R^5$, and $R^6$ are as defined herein. The poly(arylene ether) copolymer includes less than 0.1 weight percent of incorporated amine groups. A method of the manufacture of a poly(arylene ether) copolymer is also disclosed. A curable composition including the poly(arylene ether) copolymer and cured products derived therefrom are also described.

19 Claims, No Drawings

POLY(ARYLENE ETHER) COPOLYMER

CROSS-REFERENCE TO RELATED APPLICATIONS

This application claims the benefit of European Patent Application No. 18199174.6, filed Oct. 8, 2018, which is incorporated by reference herein in its entirety.

BACKGROUND

Thermosetting resins are materials that cure to form thermoset polymers, commonly referred to as "thermosets". Thermosets can be used in a wide variety of consumer and industrial products. For example, thermosets are used in protective coatings, adhesives, electronic laminates (such as those used in the fabrication of computer circuit boards), flooring, and paving applications, glass fiber-reinforced pipes, and automotive parts (including leaf springs, pumps, and electrical components). Since residual impurities such as amines can, for example, react with the resins or catalyze the curing reaction between thermosetting resins, the presence of residual amines in poly(phenylene ether)s could affect the curing process with the above mentioned resins. It would be advantageous to provide poly(phenylene ether)s for use in thermosets, wherein the polyphenylene ethers have lower residual amines to potentially improve the curing process and thereby the final properties of the cured materials.

Therefore, there is a need to develop a method to make poly(arylene ether)s that possess very low or no residual amine content. Such poly(arylene ether) compositions can be especially useful in formulations to make a variety of article, for example laminates for printed circuit boards.

BRIEF DESCRIPTION

A poly(arylene ether) copolymer that is the product of oxidative copolymerization of monomers comprising a monohydric phenol and a dihydric phenol, wherein the dihydric phenol is of the formula

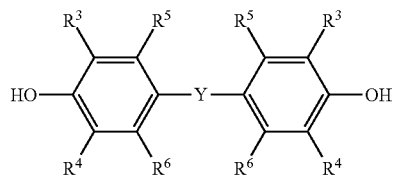

wherein $R^3$ and $R^4$ and $R^5$ and $R^6$ are independently at each occurrence hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and Y has a structure

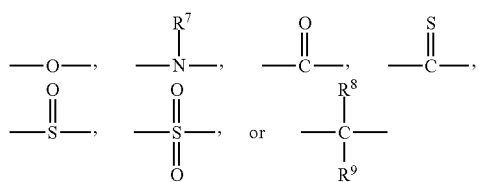

wherein each occurrence of $R^7$ is independently hydrogen or $C_{1-12}$ hydrocarbyl, and each occurrence of $R^8$ and $R^9$ is hydrogen, $C_{1-12}$ hydrocarbyl, or $C_{1-6}$ hydrocarbylene wherein $R^8$ and $R^9$ collectively form a $C_{4-12}$ cycloalkylene group; wherein the poly(arylene ether) copolymer comprises less than or equal to 0.1 weight percent of incorporated amine groups.

A method of making a poly(arylene ether) copolymer comprises oxidatively copolymerizing a monohydric phenol and a dihydric phenol in a solvent in the presence of a catalyst composition comprising a metal source, preferably a copper source; 0.18 to 0.40 weight percent of a secondary alkylene diamine ligand, preferably N,N'-di-tert-butyl-1,2-ethylene diamine; 0 to 0.2 weight percent of a secondary monoamine, preferably di-n-butylamine; and a tertiary monoamine, preferably dimethylbutylamine; wherein weight percent of each component of the catalyst composition is based on the total weight of the monohydric phenol and the dihydric phenol; to form the poly(arylene ether) copolymer.

A poly(arylene ether) copolymer made by the method above has a number average molecular weight of 500 to 2,500 grams per mole and a weight average molecular weight of 1,000 to 6,000 grams per mole, wherein number average molecular weight and weight average molecular weight are as determined by gel permeation chromatography; an intrinsic viscosity if 0.04 to 0.15 deciliter per gram measured at 25° C. in chloroform; less than or equal to 0.1 weight percent of incorporated dibutylamine groups; and 0.5 to 1.5 weight percent of units derived from 3,3',5,5'-tetramethyl-4,4'-biphenol; preferably, wherein the poly(arylene) ether copolymer comprises repeating units derived from 2,6-dimethyl phenol and 2,2-bis(3,5-dimethyl-4-hydroxyphenyl)propane.

A curable composition comprises the poly(arylene ether) copolymer, a curing promoter, and, optionally, an auxiliary curable resin.

A thermoset composition comprises the cured product of the curable composition.

An article comprises the thermoset composition.

The above described and other features are exemplified by the following detailed description.

DETAILED DESCRIPTION

The present inventors have advantageously discovered a method for producing poly(arylene ether) copolymers having a significantly reduced amount of incorporated amine groups. Accordingly, an aspect of the present disclosure is a poly(arylene ether) copolymer.

The poly(arylene ether) copolymer is the product of oxidative copolymerization of monomers comprising a monohydric phenol and a dihydric phenol. The monohydric phenol can have the structure

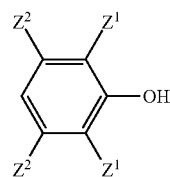

wherein $Z^1$ is independently at each occurrence is halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and $Z^2$ is independently at each occurrence hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atom. In an embodiment, the monohydric phenol can be 2-methylphenol, 2,5-dimethylphenol, 2,6-dimethylphenol, 2,3,6-trimethylphenol, and combinations thereof. In some embodiments, the monohydric phenol comprises 2,6-dimethyl phenol, 2,3,6-trimethyl phenol, or a combination thereof. In a specific embodiment, the monohydric phenol comprises 2,6-dimethylphenol.

In addition to the monohydric phenol, the monomers comprise a dihydric phenol, wherein the dihydric phenol has the structure

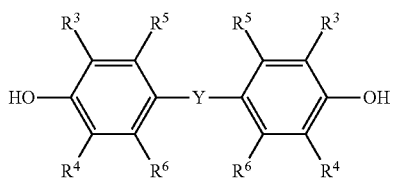

wherein $R^3$ and $R^4$ and $R^5$ and $R^6$ are independently at each occurrence hydrogen, halogen, unsubstituted or substituted C1-12 primary or secondary hydrocarbyl, unsubstituted or substituted C1-12 hydrocarbylthio, unsubstituted or substituted C1-12 hydrocarbyloxy, or unsubstituted or substituted $C_{2-12}$ halohydrocarbyloxy wherein at least two carbon atoms separate the halogen and oxygen atoms. Y in the above formula has a structure

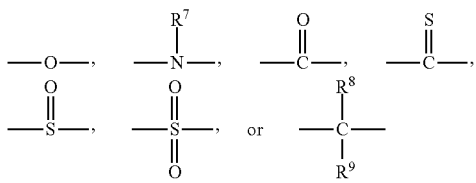

wherein each occurrence of $R^7$ is independently hydrogen or unsubstituted or substituted $C_{1-12}$ hydrocarbyl, and each occurrence of $R^8$ and $R^9$ is hydrogen, unsubstituted or substituted $C_{1-12}$ hydrocarbyl, or unsubstituted or substituted $C_{1-6}$ hydrocarbylene wherein $R^8$ and $R^9$ collectively form a $C_4$-$C_{12}$ cycloalkylene group.

In some embodiments, the dihydric phenol can be 1,1-bis(3,5-dimethyl-4-hydroxyphenyl)ethane, 1,1-bis(3-chloro-4-hydroxyphenyl)ethane, 1,1-bis(3-methyl-4-hydroxyphenyl)-ethane, 1,2-bis(4-hydroxy-3,5-dimethylphenyl)-1,2-diphenylethane, 1,2-bis(3-methyl-4-hydroxyphenyl)-1,2-diphenylethane, 1,2-bis(3-methyl-4-hydroxyphenypethane, 2,2'-binaphthol, 2,2'-biphenyl, 2,2'-dihydroxy-4,4'-dimethoxybenzophenone, 2,2'-dihydroxy-4-methoxybenzophenone, 2,2'-dihydroxybenzophenone, 2,2-bis(3,5-dichloro-4-hydroxyphenyl)propane, 2,2-bis(3-bromo-4-hydroxyphenyl)propane, 2,2-bis(3-phenyl-4-hydroxyphenyl)propane, 2,2-bis(3-methyl-4-hydroxyphenyl)propane, 2,2-bis(3,5-dimethyl-4-hydroxyphenyl)propane, 1,1-bis(3,5-dimethyl-4-hydroxyphenyl)-1-phenylethane, 1,1-bis(3-chloro-4-hydroxyphenyl)-1-phenylethane, 1,1-bis(3-methyl-4-hydroxyphenyl)-1-phenylethane, 2,2-bis(4-hydroxy-3,5-dimethyl phenyl)-1-phenylpropane, 2,2-bis(4-hydroxy-3,5-dimethyl phenyl)hexane, 2,2-bis(4-hydroxy-3,5-dimethylphenyl)pentane, 2,2-bis(3-methyl-4-hydroxynaphthyl)propane, 2,2-bis(3-methyl-4-hydroxyphenyl)-1-phenylpropane, 2,2-bis(3-methyl-4-hydroxyphenyl)hexane, 2,2-bis(3-methyl-4-hydroxyphenyl)pentane, 2,2'-methylenebis(4-methylphenol), 2,2'-methylenebis[4-methyl-6-(1-methylcyclohexyl)phenol], 3,3',5,5'-tetramethyl-4,4'-biphenol, 3,3'-dimethyl-4,4'-biphenol, bis(2-hydroxyphenyl)-methane, bis(4-hydroxy-2,6-dimethyl-3-methoxyphenyl)methane, bis(3,5-dimethyl-4-hydroxyphenyl)methane, bis(3-methyl-4-hydroxyphenyl)methane, bis-(4-hydroxy-3,5-dimethyl phenyl)-cyclohexylmethane, bis(4-hydroxy-3,5-dimethyl phenyl) phenylmethane, bis(3-methyl-4-hydroxyphenyl) cyclohexylmethane, bis(3-methyl-4-hydroxyphenyl) methane, bis(3,5-dimethyl-4-hydroxyphenyl/methane, bis (3-methyl-4-hydroxyphenyl)phenylmethane, 2,2',3,3',5,5'-hexamethyl-4,4'-biphenol, octafluoro-4,4'-biphenol, 2,3,3',5,5'-pentamethyl-4,4'-biphenol, 1,1-bis(3,5-dibromo-4-hydroxyphenyl)cyclohexane 1,1-bis(3,5-dimethyl-4-hydroxyphenyl)cyclohexane, bis(3-methyl-4-hydroxyphenyl)cyclohexane, tetrabromobiphenol, tetrabromobisphenol A, tetrabromobisphenol S, 2,2'-diallyl-4,4'-bisphenol A, 2,2'-diallyl-4,4'-bisphenol S, 3,3',5,5'-tetramethyl-4,4'-bisphenol sulfide, 3,3'-dimethyl bisphenol sulfide, 3,3',5,5'-tetramethyl-4,4'-bisphenol sulfone, or a combination thereof. In a specific embodiment, the dihydric phenol comprises 2,2-bis(3,5-dimethyl-4-hydroxyphenyl)propane.

In another specific embodiment, the monohydric phenol comprises 2,6-dimethyl phenol, 2,3,6-trimethyl phenol, or a combination thereof, and the dihydric phenol comprises 2,2-bis(3,5-dimethyl-4-hydroxyphenyl)propane.

The poly(arylene ether) copolymer can comprise 0.5 to 1.5 weight percent of units derived from the dihydric phenol. Within this range, the poly(arylene ether) copolymer can comprise 0.5 to 1.0 weight percent of units derived from the dihydric phenol.

The monohydric phenol and the dihydric phenol can be used in any ratio consistent with achieving the desired intrinsic viscosity, for example 0.04 to 0.15 deciliter per gram (dl/g), as determined by Ubbelohde viscometer at 25° C. in chloroform. For example, the monomers can include the monohydric phenol and the dihydric phenol in a mole ratio of 3:1 to 110:1. Within this range, the ratio can be at least 3.5:1, or at least 5:1, or at least 7:1. Also within this range, the ratio can be up to 50:1, or up to 25:1.

As noted above, the poly(arylene ether) copolymer can have an intrinsic viscosity of 0.04 to 0.15 deciliter per gram, measured at 25° C. in chloroform. Within this range, the intrinsic viscosity can be at least 0.06 deciliter per gram, or at least 0.075 deciliter per gram. Also within this range, the poly(arylene ether) can have an intrinsic viscosity up to 0.12 deciliter per gram, or up to 0.1 deciliter per gram, or up to 0.09 deciliter per gram.

The poly(arylene ether) can include, on average, 1.8 to 2 hydroxyl groups per molecule. Within this range, it can comprise at least 1.85 hydroxyl groups per molecule, or at least 1.90 hydroxyl groups per molecule. Also within this range, it can comprise up to 1.99 hydroxyl groups per molecule, or up to 1.97 hydroxyl groups per molecule.

The poly(arylene ether) copolymer can also include 10 to 70 mole percent of copolymer chains comprising a terminal unit derived from the dihydric phenol. For example, when the dihydric phenol is 2,2-bis(3,5-dimethyl-4-hydroxyphenyl)propane, the poly(arylene ether) copolymer can include 10 to 70 mole percent of copolymer chains comprising a terminal unit having the structure

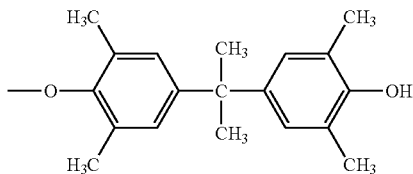

wherein the line at the left end of the structure represents a single bond to the remainder of the copolymer chain. Within the above range, the mole percent of copolymer chains comprising a terminal unit derived from the dihydric phenol can be at least 20, or at least 30, or at least 40 mole percent. Also within this range, the mole percent of copolymer chains comprising a terminal unit derived from the dihydric phenol can be up to 60 mole percent. The mole percent of copolymer chains comprising a terminal unit derived from the dihydric phenol varies with the intrinsic viscosity of the poly(arylene ether). Thus, in an embodiment, the poly(arylene ether) copolymer can have an intrinsic viscosity of 0.04 to 0.06 deciliter per gram, and the poly(arylene ether) copolymer can comprise 50 to 70 mole percent of copolymer chains comprising a terminal unit derived from the dihydric phenol. In another embodiment, the poly(arylene ether) copolymer can have an intrinsic viscosity of 0.06 to 0.09 deciliter per gram; and wherein the poly(arylene ether) copolymer can comprise 35 to 55 mole percent of copolymer chains comprising a terminal unit derived from the dihydric phenol. In yet another embodiment, the poly(arylene ether) copolymer can have an intrinsic viscosity of 0.09 to 0.15 deciliter per gram; and wherein the poly(arylene ether) copolymer can comprise 10 to 45 mole percent of copolymer chains comprising a terminal unit derived from the dihydric phenol.

In some embodiments, the poly(arylene ether) copolymer has a weight average molecular weight of 1,000 to 6,000 grams per mole as determined by gel permeation chromatography as described in the working examples. Within this range, the weight average molecular weight can be at least 1,500 grams per mole, or at least 2,000 grams per mole, or at least 3,000 grams per mole. Also within this range, the weight average molecular weight can be up to 5,000 grams per mole, or up to 4,000 grams per mole, or up to 3,800 grams per mole. In an embodiment, the poly(arylene ether) copolymer has a number average molecular weight of 500 to 2,500 grams per mole as determined by gel permeation chromatography as described in the working examples. Within this range, the number average molecular weight can be at least 700 grams per mole, or at least about 1,000 grams per mole, or at least 1,200 grams per mole. Also within this range, the number average molecular weight can be up to 2,000 grams per mole, or up to 1,700 grams per mole. In some embodiments, the poly(arylene ether) copolymer has a ratio of weight average molecular weight to number average molecular weight (also referred to as "polydispersity" or "dispersity") of 1.9 to 3. Within this range, the ratio can be at least 2.0. Also within this range, the ratio can be up to 2.8, or up to 2.6, or up to 2.4.

Although the poly(arylene ether) copolymer is enriched in low molecular weight species, it can advantageously comprise very low levels of residual monomers. Thus, in an embodiment where the poly(arylene ether) copolymer comprises 2,6-dimethylphenol and the dihydric phenol comprises 2,2-bis(3,5-dimethyl-4-hydroxyphenyl)propane, the poly(arylene ether) copolymer comprises less than 150 parts per million by weight of residual (unreacted) 2,6-dimethylphenol and less than 1 weight percent of residual (unreacted) 2,2-bis(3,5-dimethyl-4-hydroxyphenyl)propane, each as measured by gas chromatography as described in the working examples. In some embodiments, the poly(arylene ether) copolymer can comprise residual (unreacted) 2,6-dimethylphenol in an amount of 50 ppm or less. In some embodiments, the poly(arylene ether) copolymer can be devoid of residual (unreacted) 2,6-dimethylphenol. In some embodiments, the poly(arylene ether) copolymer can comprise 0.2 to less than 1 weight percent, or 0.5 to less than 1 weight percent of residual (unreacted) 2,2-bis(3,5-dimethyl-4-hydroxyphenyl)propane.

The monohydric phenol is incorporated into the poly(arylene ether) copolymer primarily as a 1,4-phenylene ether unit. However, under certain polymerization conditions, some of the monohydric phenol can form a diphenoquinone species that can be incorporated into the poly(arylene ether) copolymer. For example, when the monohydric phenol comprises 2,6-dimethylphenol and the dihydric phenol comprises 2,2-bis(3,5-dimethyl-4-hydroxyphenyl)propane, the poly(arylene ether) can comprise 0.5 to 1.5 weight percent of units derived from 3,3',5,5'-tetramethyl-4,4'-biphenol.

When the copolymerization is conducted in the presence of a primary or secondary amine catalyst component, the poly(arylene ether) can incorporate amine substituents. Advantageously, the present inventors have discovered that through the use of a particular catalyst composition, the poly(arylene ether) copolymer can comprise less than or equal to 0.1 weight percent of incorporated amine groups. For example, when oxidative copolymerization comprises polymerizing in the presence of a catalyst comprising di-n-butylamine, the poly(arylene ether) can comprise less than 0.1 weight percent of incorporated dibutylamine groups (measured as —N(CH$_2$CH$_2$CH$_2$CH$_3$)$_2$ and determined by $^1$H NMR spectroscopy, as described in the working examples below. Within this range, the poly(arylene ether) copolymer can comprise less than 0.099 weight percent, or less than 0.01 weight percent, or less than 0.005 weight percent of incorporated amine groups. Also within this range, the poly(arylene ether) copolymer can comprise at least 0.001 weight percent, or at least 0.005 weight percent, or at least 0.01 weight percent of incorporated amine groups. In some embodiments, the poly(arylene ether) can be devoid of incorporated amine groups, for example, devoid of incorporated dibutylamine groups.

In a specific embodiment, a poly(arylene ether) copolymer is the product of oxidative copolymerization of 2,6-dimethylphenol and 2,2-bis(3,5-dimethyl-4-hydroxyphenyl) propane in a weight ratio of 1.5:1 to 6:1; wherein the poly(arylene ether) copolymer has an intrinsic viscosity of 0.04 to 0.09 deciliter per gram, or 0.07 to 0.09 deciliter per gram, measured at 25° C. in chloroform; wherein the poly(arylene ether) comprises, on average, 1.90 to 1.99 hydroxyl groups per molecule; wherein the poly(arylene ether) copolymer comprises less than 150 parts per million by weight of residual (unreacted) 2,6-dimethylphenol; and wherein the poly(arylene ether) copolymer comprises less than 0.1 weight percent of incorporated amine groups.

In a specific embodiment, the oxidative copolymerization is conducted in the presence of a catalyst composition comprising di-n-butylamine, and the poly(arylene ether) copolymer comprises less than or equal to 0.1 weight percent of incorporated dibutylamine groups, even more preferably 0.01 to 0.1 weight percent of incorporated dibutylamine groups. In another specific embodiment, the oxidative copolymerization is conducted in the presence of a catalyst composition excluding di-n-butylamine, and the poly(arylene ether) copolymer is devoid of incorporated dibutylamine groups.

Another aspect of the present disclosure is a method of making a poly(arylene ether) copolymer. The method comprises oxidatively copolymerizing a monohydric phenol and a dihydric phenol in a solvent in the presence of a catalyst composition to form the poly(arylene ether) copolymer.

The monohydric phenol and the dihydric phenol are describe above. The solvent can preferably be an aromatic hydrocarbon solvent, for example a $C_{6-18}$ aromatic hydrocarbon solvent. Suitable aromatic hydrocarbon solvents include, for example, benzene, toluene, xylenes, and the like, and combinations thereof. In an embodiment, the aromatic hydrocarbon solvent comprises toluene. In addition to the aromatic hydrocarbon solvent, the solvent can, optionally, further comprise a $C_{3-8}$ aliphatic alcohol that is a poor solvent for the poly(arylene ether), such as, for example, n-propanol, isopropanol, n-butanol, t-butanol, n-pentanol, and the like, and combinations thereof. A preferred $C_{3-8}$ aliphatic alcohol is n-butanol. The solvent can further comprise, in addition to a $C_{6-18}$ aromatic hydrocarbon and a $C_{3-8}$ aliphatic alcohol, methanol or ethanol, which act as an anti-solvent for the poly(arylene ether). The $C_{6-18}$ aromatic hydrocarbon, the $C_{3-8}$ aliphatic alcohol, and the methanol or ethanol can be combined in a wide range of proportions, but it can be preferred that the solvent comprise at least 50 weight percent of the $C_{6-18}$ aromatic hydrocarbon. In some embodiments, no solvents other than the aromatic hydrocarbon solvent are present.

Although there is no particular limit on the concentrations of the monohydric phenol and the dihydric phenol in the solvent, it can be preferred to achieve a balance between the increased efficiency of higher monomer concentrations and the easy-to-handle solution viscosities associated with lower monomer concentrations. In some embodiments, the monohydric phenol, the dihydric phenol, and the solvent are used in amounts such that the ratio of the total weight of the monohydric phenol and the dihydric phenol to the total weight of the monohydric phenol, the dihydric phenol, and the solvent is 0.1:1 to 0.5:1. Within this range, the ratio can be at least 0.2:1, or at least 0.25:1, or at least 0.3:1. Also within this range, the ratio can be up to 0.45:1, or up to 0.4:1, or up to 0.38:1.

The method comprises oxidatively copolymerizing the monomers in the presence of a catalyst composition. The catalyst composition includes a metal source, a secondary alkylene diamine ligand, a tertiary monoamine, and optionally a secondary monoamine. The catalyst metal can be, for example, copper, manganese, cobalt, iron, and combinations thereof. In an embodiment, the metal source is preferably a copper source. The copper source can comprise a salt of cupric or cuprous ion, including halides, oxides and carbonates. Preferred copper salts include cuprous oxides, cupric oxides, and their combinations.

In some embodiments, the concentration of the catalyst metal source can be 0.02 to 0.1 weight percent, based on the total weight of monomer (i.e., weight of monohydric phenol plus weight of dihydric phenol). Within this range, the catalyst metal source can be present in an amount of at least 0.03 weight percent, or at least 0.04 weight percent. Also within this range, the catalyst metal source can be present in an amount of up to 0.095 weight percent, or up to 0.09 weight percent.

In addition to the metal ion source, the catalyst composition comprises a secondary alkylene diamine ligand. Suitable secondary alkylene diamine ligands are described in U.S. Pat. No. 4,028,341 to Hay and are represented by the formula $$R^b\text{—NH—}R^a\text{—NH—}R^c$$

wherein $R^a$ is a substituted or unsubstituted divalent residue wherein two or three aliphatic carbon atoms form the closest link between the two diamine nitrogen atoms; and $R^b$ and $R^c$ are each independently isopropyl or a substituted or unsubstituted $C_{4-8}$ tertiary alkyl group. Examples of $R^a$ include ethylene, 1,2-propylene, 1,3-propylene, 1,2-butylene, 1,3-butylene, 2,3-butylene, the various pentylene isomers having from two to three carbon atoms separating the two free valances, phenylethylene, tolylethylene, 2-phenyl-1,2-propylene, cyclohexylethylene, 1,2-cyclohexylene, 1,3-cyclohexylene, 1,2-cyclopropylene, 1,2-cyclobutylene, 1,2-cyclopentylene, and the like. Preferably, $R^a$ is ethylene. Examples of $R^b$ and $R^c$ can include isopropyl, t-butyl, 2-methyl-but-2-yl, 2-methyl-pent-2-yl, 3-methyl-pent-3-yl, 2,3-dimethyl-buty-2-yl, 2,3-dimethylpent-2-yl, 2,4dimethyl-pent-2-yl, 1-methylcyclopentyl, 1-methylcyclohexyl and the like. A highly preferred example of $R^b$ and $R^c$ is t-butyl. An exemplary secondary alkylene diamine ligand is N,N'-di-t-butylethylenediamine (DBEDA).

The catalyst composition comprises the secondary alkylene diamine ligand in an amount of 0.18 to 0.40 weight percent, based on the total weight of the monomers (i.e., weight of monohydric phenol plus weight of dihydric phenol). Within this range, the secondary alkylene diamine ligand can be present in an amount of at least 0.20 weight percent, or at least 0.23 weight percent, or at least 0.25 weight percent. Also within this range, the secondary alkylene diamine ligand can be present in an amount of up to 0.35 weight percent, or 0.32 weight percent, or 0.30 weight percent.

In addition to the catalyst metal source and the secondary alkylene diamine ligand, the catalyst composition can optionally further include a secondary monoamine. Suitable secondary monoamine ligands are described in commonly assigned U.S. Pat. No. 4,092,294 to Bennett et al. and represented by the formula $$R^d\text{—NH—}R^e$$

wherein $R^d$ and $R^e$ are each independently substituted or unsubstituted $C_{1-12}$ alkyl groups, and preferably substituted or unsubstituted $C_{3-6}$ alkyl groups. Examples of the secondary monoamine include di-n-propylamine, di-isopropylamine, di-n-butylamine, di-sec-butylamine, di-t-butylamine, N-isopropyl-t-butylamine, N-sec-butyl-t-butylamine, di-n-pentylamine, bis(1,1-dimethylpropyl)amine, and the like. A highly preferred secondary monoamine is di-n-butylamine (DBA).

The catalyst composition comprises the secondary monoamine in an amount of 0 to 0.2 weight percent, based on the total weight of the monomers (i.e., weight of monohydric phenol plus weight of dihydric phenol). Within this range, the catalyst composition can include the secondary monoamine in an amount of at least 0.05 weight percent, or at least 0.07 weight percent, or at least 0.08 weight percent. Also within this range, the catalyst composition can include the secondary monoamine in an amount of up to 0.15 weight percent, or up to 0.12 weight percent. In some embodiments, the catalyst composition is devoid of the secondary monoamine (i.e., a secondary monoamine is excluded from the catalyst composition).

The catalyst composition further comprises a tertiary monoamine. Suitable tertiary monoamine ligands are described in the abovementioned Hay U.S. Pat. No. 4,028,341 and Bennett U.S. Pat. No. 4,092,294 patents and include heterocyclic amines and certain trialkyl amines characterized by having the amine nitrogen attached to at least two groups which have a small cross-sectional area. In the case of trialkylamines, it is preferred that at least two of the alkyl groups be methyl with the third being a primary $C_{1-8}$ alkyl group or a secondary $C_{3-8}$ alkyl group. It is especially preferred that the third substituent have no more than four carbon atoms. A highly preferred tertiary amine is dimethylbutylamine (DMBA).

The tertiary monoamine can be present in the catalyst composition in an amount of up to 3 weight percent, based on the total weight of the monomers (i.e., weight of monohydric phenol plus weight of dihydric phenol). Within this range, the catalyst composition can include the tertiary monoamine in an amount of at least 0.1 weight percent, or at least 0.5 weight percent, or at least 1.0 weight percent, or at least 1.5 weight percent. Also within this range, the catalyst composition can include the tertiary monoamine in an amount of up to 2.5 weight percent, or us to 2.3 weight percent, or up to 2.1 weight percent, or up to 1.9 weight percent.

The oxidative copolymerization conducted in the presence of the catalyst composition described above optionally be conducted in the presence of a bromide ion. A bromide ion can be supplied, for example, as a cuprous bromide or cupric bromide salt. Bromide ion can also be supplied by addition of a 4-bromophenol, such as 2,6-dimethyl-4-bromophenol. Bromide ion can also be supplied in the form of hydrobromic acid, an alkali metal bromide, or an alkaline earth metal bromide. Sodium bromide and hydrobromic acid are highly preferred bromide sources. A suitable ratio of bromide ion to copper ion is 2 to 20, preferably 3 to 20, more preferably 4 to 7.

The oxidative polymerization can optionally further be conducted in the presence of one or more additional components, including a lower alkanol or glycol, a small amount of water, or a phase transfer agent. It is generally not necessary to remove reaction byproduct water during the course of the reaction. Suitable phase transfer agents can include, for example, a quaternary ammonium compound, a quaternary phosphonium compound, a tertiary sulfonium compound, or a combination thereof. Preferably, the phase transfer agent can be of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, CH3(CH3(CH2)3)3NX, and $CH_3(CH_3(CH_2)_2)_3NX$, wherein X is Cl⁻, a $C_{1-8}$ alkoxy or a $C_{6-18}$ aryloxy. An effective amount of a phase transfer agent can be 0.1 to 10 wt %, or 0.5 to 2 wt %, each based on the weight of the reaction mixture. In a specific embodiment, a phase transfer agent is present and comprises N,N,N'-didecyldimethyl ammonium chloride.

Various modes of addition of the monohydric phenol and the dihydric phenol to the copolymerization mixture are possible. In some embodiments, all of the monohydric phenol and all of the dihydric phenol can be added to the reactor before initiating polymerization. In another embodiment, all of the dihydric phenol can be added to the reactor before initiating polymerization, and a portion of the monohydric phenol can be added to the reaction before initiating polymerization, such that the molar ratio of monohydric phenol to dihydric phenol is 0.1 to 30 before initiating polymerization. Within this range, the ratio can be at least 0.5, or at least 1. Also within this range, the ratio can be up to 20, or up to 10.

In another embodiment, a portion of the monohydric phenol and a portion of the dihydric phenol can be added to the reactor before initiating polymerization, and the remainder of the monohydric phenol and the remainder of the dihydric phenol can be added to the reactor after initiating polymerization.

During copolymerization, the reaction temperature can be maintained at a temperature of 20 to 80° C. Within this range, the reaction temperature can be at least 30° C., or at least 40° C. Also within this range, the reaction temperature can be up to 70° C., or up to 60° C. Different temperatures can be used at different stages of the reaction.

Depending on the precise reaction conditions chosen, the total polymerization reaction time—that is, the time elapsed between initiating oxidative polymerization and terminating oxidative polymerization—can vary, but it is typically 100 to 250 minutes, specifically 120 to 210 minutes.

In some embodiments, during copolymerization, an oxygen flow of 0.1 to 3 moles $O_2$ per hour per total moles of monohydric phenol and dihydric phenol can be maintained. Within this range, the oxygen flow can be at least 0.3 moles $O_2$ per hour per total moles of monohydric phenol and dihydric phenol, or at least 0.5 moles $O_2$ per hour per total moles of monohydric phenol and dihydric phenol. Also within this range, the oxygen flow can be up to 2 moles $O_2$ per hour per total moles of monohydric phenol and dihydric phenol, or up to 1 mole $O_2$ per hour per total moles of monohydric phenol and dihydric phenol.

The reaction can be terminated when the flow of oxygen to the reaction vessel is stopped. Residual oxygen in the reaction vessel headspace is removed by flushing with an oxygen-free gas, such as nitrogen.

The method can further comprise contacting a reaction mixture comprising the poly(arylene ether) copolymer with an aqueous solution of a sequestrant to extract the metal source from the solution. The sequestrant can comprise polyalkylene-polyamine-polycarboxylic acids, aminopolycarboxylic acids, aminocarboxylic acids, polycarboxylic acids, alkali metal salts of the foregoing acids, alkaline earth metal salts of the foregoing acids, mixed alkali metal-alkaline earth metal salts of the foregoing acids, or combinations thereof. In some embodiments, the sequestrant is nitrilotriacetic acid, ethylenediaminetetraacetic acid, alkali metal salts of the foregoing acids, alkaline earth metal salts of the foregoing acids, mixed alkali metal-alkaline earth metal salts of the foregoing acids, or combinations thereof. In an embodiment, the sequestrant comprises nitrilotriacetic acid or an alkali metal salt of nitrilotriacetic acid, for example a sodium or potassium salt of nitrilotriacetic acid, specifically trisodium nitrilotriacetate. The sequestrant mixture can be maintained at a temperature of 40 to 55° C., specifically 45 to 50° C., for 5 to 100 minutes, specifically 10 to 60 minutes, more specifically 15 to 30 minutes. This combination of temperature and time is effective for copper sequestration while also minimizing molecular weight degradation of the poly(arylene ether). The chelation step includes (and concludes with) separating the aqueous phase and the organic phase of the sequestrant mixture. This separation step is conducted at a temperature of 40 to 55° C., specifically 45 to 50° C. The time interval of 5 to 100 minutes for maintaining the chelation mixture at 40-55° C. is measured from the time at which the post-termination reaction mixture is first combined with sequestrant to the time at which separation of the aqueous and organic phases is complete.

The sequestrant and metal ion are present in a molar ratio of 1.0 to 1.5. Within this range, the molar ratio can be at least 1.05, or at least 1.1, or at least 1.15. Also within this range, the molar ratio can be up to 1.4, or up to 1.3.

The method can further comprise isolating the poly (arylene ether) from the organic phase. Isolation can be by, for example, precipitation of the poly(arylene ether) which can be induced by appropriate selection of reaction solvent described above, or by the addition of an anti-solvent to the reaction mixture. Suitable anti-solvents include lower alkanols having one to about ten carbon atoms, acetone and hexane. The preferred anti-solvent is methanol. The anti-solvent can be employed at a range of concentrations relative to the organic solvent, with the optimum concentration depending on the identities of the organic solvent and anti-solvent, as well as the concentration and intrinsic viscosity of the poly(arylene ether) product. When the organic solvent is toluene and the anti-solvent is methanol, a toluene:methanol weight ratio of 50:50 to 80:20 is suitable, with ratios of 60:40 to 70:30 being preferred, and 63:37 to 67:33 being more preferred. These preferred and more preferred ratios are useful for producing a desirable powder morphology for the isolated poly(phenylene ether) resin, without generating either stringy powder or excessive powder fines.

Alternatively, the poly(arylene ether) solution and the aqueous sequestrant solution can be separated with a liquid-liquid centrifuge. Once this separation has been effected, the polyfunctional poly(arylene ether) can be isolated from the poly(arylene ether) solution using a total isolation method. Suitable total isolation methods include, for example, devolatilizing extrusion, spray drying, wiped film evaporation, flake evaporation, and combinations of the foregoing methods. The isolated polyfunctional poly(arylene ether) can have an intrinsic viscosity of about 0.04 to about 0.15 deciliter per gram at 25° C. in chloroform, as described above.

An important advantage of the method described herein is that the concentration of the secondary monoamine has been significantly reduced, unexpectedly allowing for the preparation of poly(arylene ether) copolymers having reduced amounts of incorporated amine groups. For example, in some embodiments, the catalyst composition can include 0.05 to 0.15 weight percent of the secondary monoamine (e.g., di-n-butylamine), and the resulting poly(arylene ether) copolymer can have 0.01 to 0.1 weight percent of incorporated amine groups (e.g., incorporated dibutylamine groups). In some embodiments, the catalyst composition can exclude a secondary monoamine (e.g., di-n-butylamine), and the resulting poly(arylene ether) copolymer can be devoid of incorporated amine groups.

Another embodiment is a poly(arylene ether) copolymer made by the above method. The poly(arylene ether) made by the method can have a number average molecular weight of 500 to 2,500 grams per mole and a weight average molecular weight of 1,000 to 6,000 grams per mole, wherein number average molecular weight and weight average molecular weight are as determined by gel permeation chromatography; an intrinsic viscosity if 0.04 to 0.15 deciliter per gram measured at 25° C. in chloroform; and less than 0.1 weight percent of incorporated amine groups. The poly(arylene ether) can comprise repeating units derived from 2,6-dimethyl phenol, 2,3,6-trimethyl phenol, or a combination thereof, and 2,2-bis(3,5-dimethyl-4-hydroxyphenyl)propane; preferably wherein the poly(arylene ether) copolymer comprises 0.5 to 1.5 weight percent of units derived from 2,2-bis(3,5-dimethyl-4-hydroxyphenyl)propane. In a specific embodiment, the poly(arylene ether) copolymer made by the method described herein is the product of oxidative copolymerization of 2,6-dimethylphenol and 2,2-bis(3,5-dimethyl-4-hydroxyphenyl)propane, and further has, on average, 1.90 to 1.99 hydroxyl groups per molecule, less than 150 parts per million by weight of residual (unreacted) 2,6-dimethylphenol, and less than 0.1 weight percent of incorporated dibutylamine groups.

In some embodiments, the oxidative copolymerization is conducted in the presence of a catalyst composition comprising di-n-butylamine, and the poly(arylene ether) copolymer comprises less than or equal to 0.1 weight percent of incorporated dibutylamine groups, even more preferably 0.01 to 0.1 weight percent of incorporated dibutylamine groups. In another specific embodiment, the oxidative copolymerization is conducted in the presence of a catalyst composition excluding di-n-butylamine, and the poly (arylene ether) copolymer is devoid of incorporated dibutylamine groups.

Accordingly, the present inventors have unexpectedly discovered that a particular catalyst composition can be useful for preparing a poly(arylene ether) copolymer having low levels of incorporated amine. The improved purity of the poly(arylene ether) copolymers described herein can be particularly useful, for example, when such copolymers are to be incorporated in various thermoset resins, as the low levels of amine impurities can facilitate curing of the resins.

Another aspect of the present disclosure is a curable composition. The curable composition comprises the poly (arylene ether) copolymer made by the method described above and an auxiliary curable resin, a curable unsaturated monomer composition, or both. In some embodiments, the curable composition can optionally further comprise a curing promoter. The auxiliary curable resin can be a thermoset resin, for example, an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof.

Epoxy resins useful as thermoset resins can be produced by reaction of phenols or polyphenols with epichlorohydrin to form polyglycidyl ethers. Examples of useful phenols for production of epoxy resins include substituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines. Epoxy resins can be converted into solid, infusible, and insoluble three dimensional networks by curing with cross-linkers, often called curing agents, or hardeners. Curing agents are either catalytic or coreactive. Coreactive curing agents have active hydrogen atoms that can react with epoxy groups of the epoxy resin to form a cross-linked resin. The active hydrogen atoms can be present in functional groups comprising primary or secondary amines, phenols, thiols, carboxylic acids, or carboxylic acid anhydrides. Examples of coreactive curing agents for epoxy resins include aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, or a combination thereof. A catalytic curing agent functions as an initiator for epoxy resin homopolymerization or as an accelerator for coreactive curing agents. Examples of catalytic curing agents include tertiary amines, such as 2-ethyl-4-methylimidazole, Lewis acids, such as boron trifluoride, and latent cationic cure catalysts, such as diaryliodonium salts.

The thermoset resin can be a cyanate ester. Cyanate esters are compounds having a cyanate group (—O—C≡N) bonded to carbon via the oxygen atom, i.e. compounds with C—O—C≡N groups. Cyanate esters useful as thermoset resins can be produced by reaction of a cyanogen halide with a phenol or substituted phenol. Examples of useful phenols include bisphenols utilized in the production of epoxy resins, such as bisphenol A, bisphenol F, and novolac resins based on phenol or o-cresol. Cyanate ester prepolymers are prepared by polymerization/cyclotrimerization of cyanate esters. Prepolymers prepared from cyanate esters and diamines can also be used.

The thermoset resin can be a bismaleimide. Bismaleimide resins can be produced by reaction of a monomeric bismaleimide with a nucleophile such as a diamine, aminophenol, or amino benzhydrazide, or by reaction of a bismaleimide with diallyl bisphenol A. Specific examples of bismaleimide resins can include 1,2-bismaleimido ethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenylether, 3,3'-bismaleimidodiphenylsulfone, 4,4'-bismaleimidodiphenylsulfone, 4,4'-bismaleimidodicyclohexylmethane, 3,5-bis(4-maleimidophenyl)pyridine, 2,6-bismaleimidopyridine, 1,3-bis(maleimidomethyl)cyclohexane, 1,3-bis(maleimidomethyl)benzene, 1,1-bis(4-maleimidophenyl)cyclohexane, 1,3-bis(dichloromaleimido)benzene, 4,4'-bis(citraconimido)diphenylmethane, 2,2-bis(4-maleimidophenyl)propane, 1-phenyl-1,1-bis(4-maleimidophenyl)ethane, N,N-bis(4-maleimidophenyl)toluene, 3,5-bismaleimido-1,2,4-triazole N,N'-ethylenebismaleimide, N,N'-hexamethylenebismaleimide, N,N'-m-phenylenebismaleimide, N,N'-p-phenylenebismaleimide, N,N'-4,4'-diphenylmethanebismaleimide, N,N'-4,4'-diphenyletherbismaleimide, N,N'-4,4'-diphenylsufonebismaleimide, N,N'-4,4'-dicyclohexylmethanebismaleimide, N,N'-.alpha,alpha'-4,4'-dimethylenecyclohexanebismaleimide, N,N'-m-methaxylenebismaleimide, N,N'-4,4'-diphenylcyclohexanebismaleimide, and N,N'-methylenebis(3-chloro-p-phenylene)bismaleimide, as well as the maleimide resins disclosed in U.S. Pat. No. 3,562,223 to Bargain et al., and U.S. Pat. Nos. 4,211,860 and 4,211,861 to Stenzenberger. Bismaleimide resins can be prepared by methods known in the art, as described, for example, in U.S. Pat. No. 3,018,290 to Sauters et al. In some embodiments, the bismaleimide resin is N,N'-4,4'-diphenylmethane bismaleimide.

The thermoset resin can be a benzoxazine resin. As is well known, benzoxazine monomers are made from the reaction of three reactants, aldehydes, phenols, and primary amines with or without solvent. U.S. Pat. No. 5,543,516 to Ishida describes a solventless method of forming benzoxazine monomers. An article by Ning and Ishida in *Journal of Polymer Science, Chemistry Edition*, vol. 32, page 1121 (1994) describes a procedure using a solvent. The procedure using solvent is generally common to the literature of benzoxazine monomers.

The preferred phenolic compounds for forming benzoxazines include phenols and polyphenols. The use of polyphenols with two or more hydroxyl groups reactive in forming benzoxazines can result in branched or crosslinked products. The groups connecting the phenolic groups into a phenol can be branch points or connecting groups in the polybenzoxazine.

Suitable phenols for use in the preparation of benzoxazine monomers include phenol, cresol, resorcinol, catechol, hydroquinone, 2-allylphenol, 3-allylphenol, 4-allylphenol, 2,6-dihydroxynaphthalene, 2,7-dihydrooxynapthalene, 2-(diphenylphosphoryl)hydroquinone, 2,2'-biphenol, 4,4-biphenol, 4,4'-isopropylidenediphenol (bisphenol A), 4,4'-isopropylidenebis(2-methylphenol), 4,4'-isopropylidenebis(2-allylphenol), 4,4'(1,3-phenylenediisopropylidene) bisphenol (bisphenol M), 4,4'-isopropylidenebis(3-phenylphenol)4,4'-(1,4-phenylenediisoproylidene) bisphenol (bisphenol P), 4,4'-ethylidenediphenol (bisphenol E), 4,4'oxydiphenol, 4,4'thiodiphenol, 4,4'-sufonyldiphenol, 4,4'sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), Bis(4-hydroxyphenyl)methane (Bisphenol-F), 4,4'-(cyclopentylidene)diphenol, 4,4'-(cyclohexylidene) diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, isopropylidenebis(2-allylphenol), 3,3-bis (4-hydroxyphenypisobenzofuran-1(3H)-one, 1-(4-hydroxyphenyl)-3,3-dimethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), tris(4-hydroxyphenyl)methane, tris(4-hydroxyphenyl) ethane, tris(4-hydroxyphenyl)propane, tris(4-hydroxyphenyl)butane, tris(3-methyl-4-hydroxyphenyl)methane, tetrakis(4-hydroxyphenyl)ethane dicyclopentadienylbis(2,6-dimethyl phenol), dicyclopentadienyl bis(ortho-cresol), dicyclopentadienyl bisphenol, and the like.

The aldehydes used to form the benzoxazine can be any aldehyde. In some embodiments, the aldehyde has 1-10 carbon atoms. In some embodiments, the aldehyde is formaldehyde. The amine used to form the benzoxazine can be an aromatic amine, an aliphatic amine, an alkyl substituted aromatic, or an aromatic substituted alkyl amine. The amine can also be a polyamine, although the use of polyamines will, under some circumstances, yield polyfunctional benzoxazine monomers. Polyfunctional benzoxazine monomers are more likely to result in branched and/or crosslinked polybenzoxazines than monofunctional benzoxazines, which would be anticipated to yield thermoplastic polybenzoxazines.

The amines for forming benzoxazines generally have 1-40 carbon atoms unless they include aromatic rings, and then they can have 6-40 carbon atoms. The amine of di- or polyfunctional can also serve as a branch point to connect one polybenzoxazine to another. Thermal polymerization has been the preferred method for polymerizing benzoxazine monomers. The temperature to induce thermal polymerization is typically varied from 150-300° C. The polymerization is typically done in bulk, but could be done from solution or otherwise. Catalysts, such as carboxylic acids, have been known to slightly lower the polymerization temperature or accelerate the polymerization rate at the same temperature.

The thermoset resin can be a vinylbenzyl ether resin. Vinyl benzyl ether resins can be most readily prepared from condensation of a phenol with a vinyl benzyl halide, such as vinylbenzyl chloride to produce a vinylbenzyl ether. Bisphenol-A and trisphenols and polyphenols are generally used to produce poly(vinylbenzyl ethers) which can be used to produce crosslinked thermosetting resins. Vinyl benzyl ethers useful in the present composition can include those vinylbenzyl ethers produced from reaction of vinylbenzyl chloride or vinylbenzyl bromide with resorcinol, catechol, hydroquinone, 2,6-dihydroxy naphthalene, 2,7-dihydroxynapthalene, 2-(diphenylphosphoryl)hydroquinone, bis (2,6-dimethylphenol) 2,2'-biphenol, 4,4-biphenol, 2,2',6,6'-tetramethylbiphenol, 2,2',3,3',6,6'-hexamethylbiphenol, 3,3', 5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromo-bisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol (bisphenol E), 4,4' oxydiphenol, 4,4'thiodiphenol, 4,4'thiobis(2,6-dimethylphenol), 4,4'-sufonyldiphenol, 4,4'-sufonylbis(2,6-dimethylphenol) 4,4'sulfonyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2, 6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1] heptylidene)diphenol, 4,4'-(9H-fluorene-9,9-diyl)diphenol, 3,3-bis(4-hydroxyphenypisobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol(Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenypethane, bis(4-hydroxyphenyl)phenylphosphine oxide, dicyclopentadienylbis (2,6-dimethyl phenol), dicyclopentadienyl bis(ortho-cresol), dicyclopentadienyl bisphenol, and the like.

The thermoset resin can be an arylcyclobutene resin. Arylcyclobutenes include those derived from compounds of the general structure

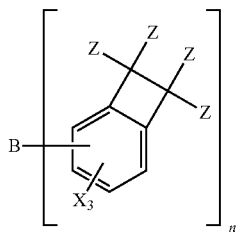

wherein B is an organic or inorganic radical of valence n (including carbonyl, sulfonyl, sulfinyl, sulfide, oxy, alkylphosphonyl, arylphosphonyl, isoalkylidene, cycloalkylidene, arylalkylidene, diarylmethylidene, methylidene dialkylsilanyl, arylalkylsilanyl, diarylsilanyl and $C_{6-20}$ phenolic compounds); each occurrence of X is independently hydroxy or $C_{1-24}$ hydrocarbyl (including linear and branched alkyl and cycloalkyl); and each occurrence of Z is independently hydrogen, halogen, or $C_{1-12}$ hydrocarbyl; and n is 1-1000, or 1-8, or 2, 3, or 4. Other useful arylcyclobutenes and methods of arylcyclobutene synthesis can be found in U.S. Pat. Nos. 4,743,399, 4,540,763, 4,642,329, 4,661,193, and 4,724,260 to Kirchhoff et al., and U.S. Pat. No. 5,391, 650 to Brennan et al.

The thermoset resin can be a perfluorovinyl ether resin. Perfluorovinyl ethers are typically synthesized from phenols and bromotetrafluoroethane followed by zinc catalyzed reductive elimination producing ZnFBr and the desired perfluorovinylether. By this route bis, tris, and other polyphenols can produce bis-, tris- and poly(perfluorovinylether) s. Phenols useful in their synthesis include resorcinol, catechol, hydroquinone, 2,6-dihydroxy naphthalene, 2,7-dihydroxynapthalene, 2-(diphenylphosphoryl) hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5-dibromobiphenol, 4,4'-isopropylidenediphenol (bisphenol A), 4,4'-isopropylidenebis(2,6-dibromophenol) (tetrabromo-bisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'(1,3-phenylenediisopropylidene)bisphenol (bisphenol M), 4,4'-isopropylidenebis(3-phenylphenol) 4,4'-(1,4-phenylenediisoproylidene)bisphenol (bisphenol P), 4,4'-ethylidenediphenol(bisphenol E), 4,4' oxydiphenol, 4,4'thiodiphenol, 4,4'thiobis(2,6-dimethylphenol), 4,4'-sufonyldiphenol, 4,4'-sufonylbis(2,6-dimethylphenol) 4,4'sulfinyldiphenol, 4,4'-hexafluoroisoproylidene)bisphenol (Bisphenol AF), 4,4'(1-phenylethylidene)bisphenol (Bisphenol AP), bis(4-hydroxyphenyl)-2,2-dichloroethylene (Bisphenol C), bis(4-hydroxyphenyl)methane (Bisphenol-F), bis(2, 6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1] heptylidene)diphenol, 4,4'-(9H-fluorene-9,9-diyl)diphenol, 3,3-bis(4-hydroxyphenypisobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol(Spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenypethane, bis(4-hydroxyphenyl)phenylphosphine oxide, dicyclopentadienylbis (2,6-dimethyl phenol), dicyclopentadienyl bis(2-methylphenol), dicyclopentadienyl bisphenol, and the like.

The thermoset resin can be an oligomer or polymer with curable vinyl functionality. Such materials include oligomers and polymers having crosslinkable unsaturation. Examples include styrene butadiene rubber (SBR), butadiene rubber (BR), and nitrile butadiene rubber (NBR) having unsaturated bonding based on butadiene; natural rubber (NR), isoprene rubber (IR), chloroprene rubber (CR), butyl rubber (a copolymer of isobutylene and isoprene, IIR), and halogenated butyl rubber having unsaturated bonding based on isoprene; ethylene-α-olefin copolymer elastomers having unsaturated bonding based on dicyclopentadiene (DCPD), ethylidene norbornene (ENB), or 1,4-dihexadiene (1,4-HD) (namely, ethylene-α-olefin copolymers obtained by copolymerizing ethylene, an α-olefin, and a diene, such as ethylene-propylene-diene terpolymer (EPDM) and ethylenebutene-diene terpolymer (EBDM). In some embodiments, an EBDM is used. Examples also include hydrogenated nitrile rubber, fluorocarbon rubbers such as vinylidenefluoride-hexafluoropropene copolymer and vinylidenefluoride-pentafluoropropene copolymer, epichlorohydrin homopolymer (CO), copolymer rubber (ECO) prepared from epichlorohydrin and ethylene oxide, epichlorohydrin allyl glycidyl copolymer, propylene oxide allyl glycidyl ether copolymer, propylene oxide epichlorohydrin allyl glycidyl ether terpolymer, acrylic rubber (ACM), urethane rubber (U), silicone rubber (Q), chlorosulfonated polyethylene rubber (CSM), polysulfide rubber (T) and ethylene acrylic rubber. Further examples include various liquid rubbers, for example various types of liquid butadiene rubbers, and the liquid atactic butadiene rubber that is butadiene polymer with 1,2-vinyl connection prepared by anionic living polymerization. It is also possible to use liquid styrene butadiene rubber, liquid nitrile butadiene rubber (CTBN, VTBN, ATBN, etc. by Ube Industries, Ltd.), liquid chloroprene rubber, liquid polyisoprene, dicyclopentadiene type hydrocarbon polymer, and polynorbornene (for example, as sold by Elf Atochem).

Polybutadiene resins, generally polybutadienes containing high levels of C1,2 addition are desirable for thermosetting matrices. Examples include the functionalized polybutadienes and poly(butadiene-styrene) random copolymers sold by Ricon Resins, Inc. under the trade names RICON, RICACRYL, and RICOBOND resins. These include butadienes containing both low vinyl content such as RICON 130, 131, 134, 142; polybutadienes containing high vinyl content such as RICON 150, 152, 153, 154, 156, 157, and P30D; random copolymers of styrene and butadiene including RICON 100, 181, 184, and maleic anhydride grafted polybutadienes and the alcohol condensates derived therefrom such as RICON 130MA8, RICON MA13, RICON 130MA20, RICON 131MAS, RICON 131MA10, RICON MA17, RICON MA20, RICON 184MA6 and RICON 156MA17. Also included are polybutadienes that can be used to improve adhesion including RICOBOND 1031, RICOBOND 1731, RICOBOND 2031, RICACRYL 3500, RICOBOND 1756, RICACRYL 3500; the polybutadienes RICON 104 (25% polybutadiene in heptane), RICON 257 (35% polybutadiene in styrene), and RICON 257 (35% polybutadiene in styrene); (meth)acrylic functionalized polybutadienes such as polybutadiene diacrylates and polybutadiene dimethacrylates. These materials are sold under the tradenames RICACRYL 3100, RICACRYL 3500, and RICACRYL 3801. Also are included are powder dispersions of functional polybutadiene derivatives including, for example, RICON 150D, 152D, 153D, 154D, P30D, RICOBOND 0 1731 HS, and RICOBOND 1756HS. Further butadiene resins include poly(butadiene-isoprene) block and random copolymers, such as those with molecular weights from 3,000-50,000 grams per mole and polybutadiene homopolymers having molecular weights from 3,000-50,000 grams per mole. Also included are polybutadiene, polyisoprene, and polybutadiene-isoprene copolymers functionalized with maleic anhydride functions, 2-hydroxyethylmaleic functions, or hydroxylated functionality.

Further examples of oligomers and polymers with curable vinyl functionality include unsaturated polyester resins based on maleic anhydride, fumaric acid, itaconic acid and citraconic acid; unsaturated epoxy (meth)acrylate resins containing acryloyl groups, or methacryloyl group; unsaturated epoxy resins containing vinyl or allyl groups, urethane (meth)acrylate resin, polyether(meth)acrylate resin, polyalcohol(meth)acrylate resins, alkyd acrylate resin, polyester acrylate resin, spiroacetal acrylate resin, diallyl phthalate resin, diallyl tetrabromophthalate resin, diethyleneglycol bisallylcarbonate resin, and polyethylene polythiol resin.

Combinations of any one or more of the foregoing thermoset resins can be used as the auxiliary resin when present in the curable composition.

In some embodiments, the curable composition comprises a curable unsaturated monomer composition, which can include, for example, a monofunctional styrenic compound (e.g., styrene), a monofunctional (meth)acrylic compound, a polyfunctional allylic compound, a polyfunctional (meth)acrylate, a polyfunctional (meth)acrylamide, a polyfunctional styrenic compound, or a combination thereof. For example, in some embodiments, the curable unsaturated monomer composition can be an alkene-containing monomer or an alkyne-containing monomer. Suitable alkene- and alkyne-containing monomers includes those described in U.S. Pat. No. 6,627,704 to Yeager et al. Suitable alkene-containing monomers include acrylate, methacrylate, and vinyl ester functionalized materials capable of undergoing free radical polymerization. Of particular use are acrylate and methacrylate materials. They can be monomers and/or oligomers such as (meth)acrylates, (meth)acrylamides, N-vinylpyrrolidone and vinylazlactones as disclosed in U.S. Pat. No. 4,304,705 of Heilman et al. Such monomers include mono-, di-, and polyacrylates and methacrylates, such as methyl acrylate, methyl methacrylate, ethyl acrylate, isopropyl methacrylate, isooctyl acrylate, isobornyl acrylate, isobornyl methacrylate, acrylic acid, n-hexyl acrylate, tetrahydrofurfuryl acrylate, N-vinylcaprolactam, N-vinylpyrrolidone, acrylonitrile, stearyl acrylate, allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethacrylate, 2-phenoxyethyl acrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldimethylmethane, 2,2-bis[1-(3-acryloxy-2-hydroxy)]propoxyphenylpropane, tris(hydroxyethyl)isocyanurate trimethacrylate; the bis-acrylates and bis-methacrylates of polyethylene glycols of molecular weight average 200-500 grams per mole, bis-acrylates and bis-methacrylates of polybutadienes of molecular weight average 1000-10,000 grams per mole, copolymerizable mixtures of acrylated monomers such as those disclosed in U.S. Pat. No. 4,652,274 to Boettcher et al. and acrylated oligomers such as those disclosed in U.S. Pat. No. 4,642,126 to Zador et al.

It can be desirable to crosslink the alkene- or alkyne-containing monomer. Particularly useful as crosslinker compounds are acrylates such as allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldi-methylmethane, 2,2-bis[1-(3-acryloxy-2-hydroxy)]propoxyphenylpropane, tris(hydroxyethyl)isocyanurate trimethacrylate; and the bis-acrylates and bis-methacrylates of polyethylene glycols of average molecular weight 200-500 grams per mole.

Also included are allylic resins and styrenic resins for example triallylisocyanurate and trimethallylisocyanurate, trimethallylcyanurate, triallylcyanurate, divinyl benzene and dibromostyrene and others described in U.S. Pat. No. 6,627,704 to Yeager et al.

A suitable curing promoter can be selected based on the functional group present on the poly(arylene ether) copolymer and, when present, the auxiliary curable resin or the curable unsaturated monomer composition. For example, the curing promoter can comprise an amine, a dicyandiamide, a polyamide, an amidoamine, a Mannich base, an anhydride, a phenol-formaldehyde resin, a carboxylic acid functional polyester, a polysulfide, a polymercaptan, an isocyanate, a cyanate ester, or a combination thereof.

The poly(arylene ether) copolymer of the present disclosure having reduced amine content can be particularly useful in curable compositions where the curing chemistry may be sensitive to the presence of amines. Thus, in a specific embodiment, the curable composition comprises the poly(arylene ether) copolymer, an epoxy resin, a cyanate ester resin, or a combination thereof, and optionally, a suitable curing promoter. In a further specific embodiment, the curable composition comprises the poly(arylene ether) copolymer, an epoxy resin, and optionally, a curing promoter. Preferred curing promoters for use with the poly(arylene ether) copolymer and an epoxy resin can include, for example, anhydride curing promoters. In yet another specific embodiment, the curable composition comprises the poly(arylene ether) copolymer, a cyanate ester resin, and optionally, a curing promoter.

Preferred curing promoters for use with the poly(arylene ether) copolymer and a cyanate ester resin can include, for example, amine curing promoters.

In addition to the poly(arylene ether) copolymer, the auxiliary resin or unsaturated monomer composition, and, when present, the curing promoter, the curable composition can, optionally, comprise a solvent. The solvent can have an atmospheric boiling point of 50 to 250° C. A boiling point in this range facilitates removal of solvent from the curable composition while minimizing or eliminating the effects of bubbling during solvent removal. The solvent can be, for example, a $C_{3-8}$ ketone, a $C_{3-8}$ N,N-dialkylamide, a $C_{4-16}$ dialkyl ether, a $C_{6-12}$ aromatic hydrocarbon, a $C_{1-3}$ chlorinated hydrocarbon, a $C_{3-6}$ alkyl alkanoate, a $C_{2-6}$ alkyl cyanide, or a combination thereof. Specific ketone solvents include, for example, acetone, methyl ethyl ketone, methyl isobutyl ketone, or a combination thereof. Specific $C_{4-9}$, N-dialkylamide solvents include, for example, dimethylformamide, dimethylacetamide, N-methyl-2-pyrrolidone, or a combination thereof. Specific dialkyl ether solvents include, for example, tetrahydrofuran, ethylene glycol monomethylether, dioxane, or a combination thereof. In some embodiments, the $C_{4-16}$ dialkyl ethers include cyclic ethers such as tetrahydrofuran and dioxane. In some embodiments, the $C_{4-16}$ dialkyl ethers are noncyclic. The dialkyl ether can, optionally, further include one or more ether oxygen atoms within the alkyl groups and one or more hydroxy group substituents on the alkyl groups. The aromatic hydrocarbon solvent can comprise an ethylenically unsaturated solvent. Specific aromatic hydrocarbon solvents include, for example, benzene, toluene, xylenes, styrene, divinylbenzenes, or a combination thereof. The aromatic hydrocarbon solvent is preferably non-halogenated (i.e., it does not include any fluorine, chlorine, bromine, or iodine atoms). Specific $C_{3-6}$ alkyl alkanoates include, for example, methyl acetate, ethyl acetate, methyl propionate, ethyl propionate, or a combination thereof. Specific $C_{2-6}$ alkyl cyanides include, for example, acetonitrile, propionitrile, butyronitrile, or a combination thereof. In some embodiments, the solvent is acetone. In some embodiments, the solvent is methyl ethyl ketone. In some embodiments, the solvent is methyl isobutyl ketone. In some embodiments, the solvent is N-methyl-2-pyrrolidone. In some embodiments, the solvent is dimethylformamide. In some embodiments, the solvent is ethylene glycol monomethyl ether.

When a solvent is utilized, the curable composition can comprise 2-100 parts by weight of the solvent, based on 100 parts by weight total of the poly(arylene ether) copolymer, the curing promoter, and the auxiliary resin or unsaturated monomer composition (when present). For example, the solvent amount can be 5-80 parts by weight, or 10-60 parts by weight, or 20-40 parts by weight, based on 100 parts by weight total of the poly(arylene ether) copolymer, the curing promoter, and any auxiliary resin. The solvent can be chosen, in part, to adjust the viscosity of the curable composition. Thus, the solvent amount can depend on variables including the type and amount of poly(arylene ether) copolymer, the type and amount of curing promoter, the type and amount of auxiliary resin, and the processing temperature used for any subsequent processing of the curable composition, for example, impregnation of a reinforcing structure with the curable composition for the preparation of a composite.

The curable composition can, optionally, further comprise one or more additives. Suitable additives include, for example, inorganic fillers, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, or a combination thereof.

The curable composition can comprise 1-99 weight percent of the auxiliary curable resin, a curable unsaturated monomer composition, or both and 1-99 weight percent of the poly(arylene ether) copolymer, based on the total weight of the curable composition. For example, the composition can include 20-99 weight percent of the auxiliary curable resin, a curable unsaturated monomer composition, or both and 1-80 weight percent of the poly(arylene ether) copolymer.

A cured composition is obtained by heating the curable composition defined herein for a time and temperature sufficient to evaporate the solvent and effect curing. For example, the curable composition can be heated to a temperature of 50-250° C. to cure the composition and provide the thermoset composition. The cured composition can also be referred to as a thermoset composition. In curing, a cross-linked, three-dimensional polymer network is formed. For certain thermoset resins, for example (meth)acrylate resins, curing can also take place by irradiation with actinic radiation at a sufficient wavelength and time. In some embodiments, curing the composition can include injecting the curable composition into a mold, and curing the injected composition at 150-250° C. in the mold.

The thermoset composition can have one or more desirable properties. For example, the thermoset composition can have a glass transition temperature of greater than or equal to 180° C., preferably greater than or equal to 190° C., more preferably greater than or equal to 200° C.

The curable composition described herein can also be particularly well suited for use in forming various articles. For example, useful articles can be in the form of a composite, a foam, a fiber, a layer, a coating, an encapsulant, an adhesive, a sealant, a molded component, a prepreg, a casing, a laminate, a metal clad laminate, an electronic composite, a structural composite, or a combination thereof. In some embodiments, the article can be in the form of a composite that can be used in a variety of application.

This disclosure is further illustrated by the following examples, which are non-limiting.

EXAMPLES

Table 1 describes the materials used in the following Examples.

TABLE 1

| Material | Description | Supplier |
|---|---|---|
| DMP | 2,6-Xylenol, CAS Registry No. 576-26-1 | SABIC |
| TMBPA | Tetramethyl bisphenol A, CAS Registry No. 5613-46-7 | Deepak Novachem |
| $Cu_2O$ | Cuprous oxide, CAS Registry No. 1317-39-1 | American Chemet Corporation |
| HBr | Hydrobromic acid, CAS Registry No. 10035-10-6 | Chemtura Corporation |
| DBEDA | N,N'-Di-tert-butylethylenediamine, CAS Registry No. 4062-60-6 | Achiewell |
| DBA | Di-n-butylamine, CAS Registry No. 111-92-2 | Oxea Corporation |
| DMBA | N,N-Dimethylbutylamine, CAS Registry No. 927-62-8 | Achiewell |
| DDAC | N,N,N'N'-Didecyldimethyl ammonium chloride, CAS Registry No. 7173-51-5 | Mason Chemical Company |
| NTA | Nitrilotriacetic acid trisodium salt, CAS Registry No. 5064-31-3 | Ascend |
| Toluene | Toluene, CAS Registry No. 108-88-3 | Surpass |

A 60-gallon reactor was used to perform the oxidative coupling reactions in the following examples.

A typical for a polymerization reaction of 2,6-xylenol and TMBPA is as follows. A monomer mixture was prepared by blending specific amounts of 2,6-xylenol, TMBPA and toluene (as shown below in Table 2) at 60° C. in a vessel and stirring this mixture until 2,6-xylenol and TMBPA were dissolved. The monomer mixture in toluene was added to the reactor after charging an additional amount of toluene (61.7 kg) initially to the reactor under nitrogen atmosphere. Then, DBA (where required), DMBA, a previously prepared mixture of DBEDA, DDAC and toluene, and a previously prepared mixture of cuprous oxide and HBr were added to the reactor, followed by introducing oxygen to the reaction mixture at time zero at room temperature. The oxygen flow rate was adjusted to be a maximum 4.25 standard cubic meters per hour (SCMH) for the first 90-110 minutes of the reaction to ensure that the headspace oxygen concentration was below 13%. Reaction temperature was also adjusted to a maximum of 40° C. during first 90-110 minutes of the reaction. After this period of time, oxygen flow was decreased to keep headspace oxygen concentration below 20% concurrently with ramping the reaction temperature from 40° C. to 49° C. after 125 minutes. Oxygen flow to the reaction was stopped to terminate the reaction at a time of 150 minutes, which is defined as "end of reaction".

After the end of reaction, the reaction mixture was heated to 60° C. before transferring the reaction mixture to another vessel for copper removal. Copper was removed from the reaction mixture by adding a chelating agent, NTA (aq), to the reaction mixture and stirring final mixture for 2 hours at 60° C. NTA forms a water soluble complex with copper present in the organic (toluene) phase of the final mixture and transfers it to the aqueous phase of the reaction mixture. The organic phase and copper-containing aqueous phase were separated by decantation to isolate a poly(arylene ether) solution in toluene. Finally, poly(arylene ether) solids were isolated by removing toluene followed by oven drying.

The prepared poly(arylene ether)s were characterized according to the following methods.

Chemical structure and composition of polyarylene ether copolymers were confirmed by proton nuclear magnetic resonance CH NMR) spectroscopy. Number average molecular weight (Mn), unreacted 2,6 xylenol content, unreacted TMBPA content, Mannich amine content, functionality and incorporated biphenyl content of poly(arylene ether)s were also determined by NMR analysis, according to procedures described in U.S. Pat. No. 7,541,421 to Carrillo et.al. All $^1H$ NMR spectra were acquired on an Agilent Technology instrument operating at an observed frequency of 600 MHz.

Intrinsic viscosity (IV) of the poly(arylene ether)s was measured by an Ubbelohde capillary-type viscometer. Different concentrations of polymers were prepared in chloroform and measurements were done at 25° C. in a thermostatted water bath. The flow time data was used to calculate the intrinsic viscosity by extrapolating the reduced viscosity to zero concentration.

Weight average molecular weight ($M_w$) and number average molecular weight ($M_n$) of the polymers were measured by gel permeation chromatography (GPC). The GPC system included an Agilent 1260 Infinity II single channel pump, an Agilent 1260 Infinity II autosampler, an Agilent 1260 Infinity II temperature controlled column compartment, and an Agilent 1260 Infinity II variable wavelength detector (VWD). The software used to control the instrument and collect the signal was Agilent GPC/SEC Software Version A.02.01. The instrument was operated in isocratic conditions with the mobile phase being $CHCl_3$ with 50 ppm DBA. Two hundred microliters of DBA was added to 4 liters of $CHCl_3$ to produce the 50 ppm DBA in $CHCl_3$ solution. Samples were prepared at a concentration of approximately 1 milligram per milliliter and the injection volume 50 μL. The VWD was operated in dual wavelength collection mode at 254 and 280 nm. The column set included two Agilent PolyPore 7.5×300 mm columns connected in series and maintained at a temperature of 40° C. The flow rate was set to 1 milliliter per minute.

Table 2 shows the amount of each component added to the reactor according to the above-described procedure for each example.

TABLE 2

| | Amount added to the reactor | | | | | |
|---|---|---|---|---|---|---|
| Component | C. Ex. 1 | Ex. 1 | Ex. 2 | Ex. 3 | C. Ex. 2 | C. Ex. 3 |
| 2,6-Xylenol | 57.77 kg | 57.70 kg | 57.70 kg | 57.77 kg | 57.77 kg | 41.7 kg |
| TMBPA | 12.26 kg | 12.33 kg | 12.33 kg | 12.26 kg | 12.26 kg | 8.53 kg |
| Toluene | 129.9 kg | 129.9 kg | 129.9 kg | 129.9 kg | 129.9 kg | 104.6 kg |

TABLE 2-continued

| | Amount added to the reactor | | | | | |
|---|---|---|---|---|---|---|
| Component | C. Ex. 1 | Ex. 1 | Ex. 2 | Ex. 3 | C. Ex. 2 | C. Ex. 3 |
| wt % TMBPA (of total monomer) | 17.51% | 17.61% | 17.61% | 17.51% | 17.51% | 16.98% |
| % Solids in the reactor | 35.0% | 35.0% | 35.0% | 35.0% | 35.0% | 32.4% |
| DBA | 69.9 | 69.9 g | 69.9 g | 0.0 g | 699.5 | 503.8 g |
| wt % DBA (of total monomer) | 0.1% | 0.1% | 0.1% | 0.0% | 1.0% | 1.0% |
| DBEDA | 102.82 g | 205.65 g | 176.27 g | 205.65 g | 102.82 g | 79.35 g |
| wt % DBEDA (of total monomer) | 0.15% | 0.29% | 0.25% | 0.29% | 0.15% | 0.16% |
| DMBA | 1299.1 g | 1299.1 g | 1299.1 g | 1299.1 g | 1299.1 g | 1175.6 g |
| wt % DMBA (of total monomer) | 1.86% | 1.86% | 1.86% | 1.86% | 1.86% | 2.34% |
| HBr, 48% solution | 217.8 g | 217.8 g | 373.4 g | 217.8 g | 217.8 g | 353.3 g |
| Cu$_2$O | 35.8 g | 35.8 g | 61.4 g | 35.8 g | 35.8 g | 24.6 g |
| wt % Cu$_2$O (of total monomer) | 0.051% | 0.051% | 0.088% | 0.051% | 0.051% | 0.049% |

As shown in Table 2, examples 2-3 were performed at much lower DBA amounts (0 to 0.1 weight percent, based on weight of monomer) compared to the DBA amount used in comparative examples 2 and 3. The amount of DBEDA in examples 2-3 were kept higher (0.25 to 0.29 weight percent, based on weight of monomer) relative to the amount of DBEDA used in comparative example 2. Other reaction parameters such as percent solids in the reactor (defined as ratio of 2,6-xylenol and TMBPA amount to the total amount of reaction components), TMBPA to total monomer ratio (wt % TMBPA), DMBA feed as well as HBr and Cu$_2$O feeds (except for Run 3) were kept constant for each of examples 2-3. Characterization of the resulting poly(arylene ether)s for each of the Table 2 examples is shown in Table 3.

In Table 3, Also in Table 3, "Functionality" is the average number of terminal hydroxyl groups per copolymer chain. For example, a copolymer sample consisting solely of linear copolymer molecules having a terminal hydroxyl group at each end would have a functionality of 2. "Incorporated DBA (Mannich amine, wt %)" is the weight percent of dibutylamino-substituted phenylene ether groups incorporated into the copolymer, based on the total weight of copolymer. The dibutylamino-substituted phenylene ether groups have a formula weight based on the structure

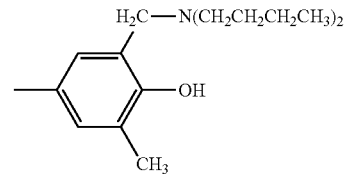

wherein the line at the left end of the structure represents a bond to the remainder of the copolymer chain. "Incorporated biphenyl groups (wt %)" is the weight percent of internal groups derived from 3,3',5,5'-tetramethyl-4,4'-biphenol and having the structure

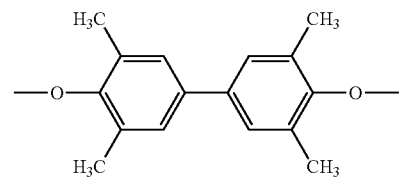

wherein the lines at each end of the molecular represent bonds to the remainder of the copolymer chain. The weight percent of "incorporated biphenyl" is based on the total weight of copolymer.

TABLE 3

| Properties | C. Ex. 1 | Ex. 1 | Ex. 2 | Ex. 3 | C. Ex. 2 | C. Ex. 3 |
|---|---|---|---|---|---|---|
| Final IV (dl/g) | 0.062 | 0.084 | 0.085 | 0.082 | 0.083 | 0.087 |
| M$_n$ by NMR (g/mol) | 1284 | 1744 | 1698 | 1733 | 1743 | — |
| M$_n$ by GPC (g/mol) | 1161 | 1527 | 1541 | 1633 | 1655 | 1198 |
| M$_w$ by GPC (g/mol) | 2240 | 3234 | 3553 | 3430 | 3709 | 2477 |
| Incorporated DBA (Mannich amine, wt %) | 0.11 | 0.096 | 0.091 | 0.00 | 0.89 | 1.05 |
| Functionality | 1.73 | 1.93 | 1.95 | 1.95 | 1.96 | 1.91 |
| Incorporated biphenyl groups (wt %) | 0.67 | 0.87 | 0.87 | 0.86 | 0.84 | 0.83 |
| Unreacted TMBPA (ppm) | 14900 | 8400 | 9700 | 9800 | 9000 | 8755 |
| Unreacted 2,6-Xylenol (ppm) | 26200 | 0.00 | 0.00 | 0.00 | 0.00 | 305 |
| TMBPA Conversion (%) | 91.5 | 95.2 | 94.5 | 94.4 | 94.9 | 94.8 |
| 2,6-Xylenol Conversion (%) | 96.8 | 100 | 100 | 100 | 100 | ~100 |
| Overall Conversion (%) | 96.4 | 99.6 | 99.5 | 99.5 | 99.6 | 99.5 |

As can be seen from the results summarized in Table 3, poly(arylene ether)s with low or no residual Mannich amine content and with desired final properties, i.e., IV, $M_n$, $M_w$, functionality, and incorporated biphenyl groups, can be obtained by decreasing or eliminating the DBA feed into the reaction respectively and increasing the DBEDA feed into the reaction at the same time. For example, examples 1 and 2, which were performed at 0.1 wt % DBA feed and 0.29 and 0.25 wt % DBEDA feeds, respectively, resulted in materials with 0.096 wt % and 0.091 wt % Mannich amine content, respectively. In contrast, comparative example 2, which was performed at 1.0 wt % DBA feed and 0.15 wt % DBEDA feed, resulted in a copolymer material with 0.89 wt % Mannich amine content. This result by itself shows that residual Mannich amine content in the copolymer product, which has desired final properties, can be decreased 10 times by decreasing the DBA feed and increasing the DBEDA feed into the reaction. Interestingly, results of example 3 show that it's possible to obtain a copolymer material with desired final properties as well as with "zero" (i.e., non-detectable) residual Mannich amine content simply by increasing the DBEDA feed into the reaction from 0.15 wt % to 0.29 wt % without addition of any DBA feed into the reactor. This finding is also supported by the results of the comparative example 1, which was performed at lower (0.1 wt %) DBA feed and lower (0.15 wt %) DBEDA feed similar to the DBEDA feed of comparative example 2. It was found that comparative example 1 resulted in a final copolymer with lower IV, $M_n$, $M_w$, and functionality compared to those of the final copolymer materials resulted from all other runs even though the residual Mannich content is low (0.11 wt %).

This disclosure further encompasses the following aspects.

Aspect 1: A poly(arylene ether) copolymer, wherein the poly(arylene ether) copolymer is the product of oxidative copolymerization of monomers comprising a monohydric phenol and a dihydric phenol, wherein the dihydric phenol is of the formula

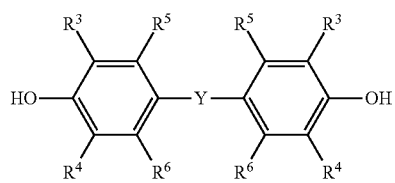

wherein $R^3$ and $R^4$ and $R^5$ and $R^6$ are independently at each occurrence hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and Y has a structure

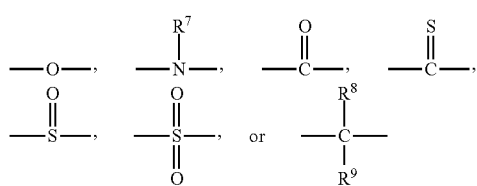

wherein each occurrence of $R^7$ is independently hydrogen or $C_{1-12}$ hydrocarbyl, and each occurrence of $R^8$ and $R^9$ is hydrogen, $C_{1-12}$ hydrocarbyl, or $C_{1-6}$ hydrocarbylene wherein $R^8$ and $R^9$ collectively form a $C_{4-12}$ cycloalkylene group; wherein the poly(arylene ether) copolymer comprises less than or equal to 0.1 weight percent of incorporated amine groups.

Aspect 2: The poly(arylene ether) copolymer of aspect 1, wherein the monohydric phenol has the structure

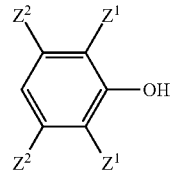

wherein $Z^1$ is independently at each occurrence halogen, unsubstituted or substituted C1-12 hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and $Z^2$ is independently at each occurrence hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atom.

Aspect 3: The poly(arylene ether) copolymer of aspect 1 or 2, wherein the monohydric phenol comprises 2,6-dimethyl phenol, 2,3,6-trimethyl phenol, or a combination thereof, and the dihydric phenol comprises 2,2-bis(3,5-dimethyl-4-hydroxyphenyl)propane.

Aspect 4: The poly(arylene ether) copolymer of any one of aspects 1 to 3, wherein the poly(arylene ether) copolymer comprises 0.5 to 1.5 weight percent of units derived from 3,3',5,5'-tetramethyl-4,4'-biphenol, preferably 0.5 to 1.0 weight percent of units derived from 3,3',5,5'-tetramethyl-4,4'-biphenol.

Aspect 5: The poly(arylene ether) copolymer of any one of aspects 1 to 4, wherein the poly(arylene ether) copolymer has a number average molecular weight of 500 to 2,500 grams per mole and a weight average molecular weight of 1,000 to 6,000 grams per mole, wherein number average molecular weight and weight average molecular weight are as determined by gel permeation chromatography.

Aspect 6: The poly(arylene ether) copolymer of any one of aspects 1 to 5, wherein the oxidative copolymerization is in the presence of a catalyst composition comprising di-n-butylamine; and wherein the poly(arylene ether) copolymer comprises less than or equal to 0.1 weight percent of incorporated dibutylamine groups, preferably 0.01 to 0.1 weight percent of incorporated dibutylamine groups.

Aspect 7: The poly(arylene ether) copolymer of any one of aspects 1 to 6, wherein the oxidative copolymerization is in the presence of a catalyst composition excluding di-n-butylamine; and wherein the poly(arylene ether) copolymer is devoid of incorporated dibutylamine groups.

Aspect 8: The poly(arylene ether) copolymer of any one of aspects 1 to 7, wherein the poly(arylene ether) copolymer has an intrinsic viscosity if 0.04 to 0.15 deciliter per gram measured at 25° C. in chloroform, preferably 0.06 to 0.1 deciliter per gram, more preferably 0.075 to 0.090 deciliter per gram.

Aspect 9: The poly(arylene ether) copolymer of any one of aspects 1 to 8, wherein the poly(arylene ether) copolymer has an average of 1.8 to 2 hydroxyl groups per molecule.

Aspect 10: A method of making a poly(arylene ether) copolymer, the method comprising: oxidatively copolymerizing a monohydric phenol and a dihydric phenol in a solvent in the presence of a catalyst composition comprising a metal source, preferably a copper source; 0.18 to 0.40 weight percent of a secondary alkylene diamine ligand, preferably N,N'-di-tert-butyl-1,2-ethylene diamine; 0 to 0.2 weight percent of a secondary monoamine, preferably di-n-butylamine; and a tertiary monoamine, preferably dimethylbutylamine; wherein weight percent of each component of the catalyst composition is based on the total weight of the monohydric phenol and the dihydric phenol; to form the poly(arylene ether) copolymer.

Aspect 11: The method of claim 10, further comprising recovering the catalyst metal source using an aqueous sequestrant solution; isolating the poly(arylene ether) by precipitation; or both.

Aspect 12: The method of aspect 10 or 11, wherein the catalyst composition comprises 0.05 to 0.15 weight percent di-n-butylamine; and wherein the poly(arylene ether) copolymer comprises 0.01 to 0.1 weight percent of incorporated dibutylamine groups.

Aspect 13: The method of aspect 10 or 11, wherein the catalyst composition excludes a secondary monoamine and the poly(arylene ether) copolymer is devoid of incorporated amine groups.

Aspect 14: A poly(arylene ether) copolymer made by the method of any one of aspects 10 to 13, wherein the poly(arylene ether) copolymer has a number average molecular weight of 500 to 2,500 grams per mole and a weight average molecular weight of 1,000 to 6,000 grams per mole, wherein number average molecular weight and weight average molecular weight are as determined by gel permeation chromatography; an intrinsic viscosity if 0.04 to 0.15 deciliter per gram measured at 25° C. in chloroform; less than or equal to 0.1 weight percent of incorporated dibutylamine groups; and 0.5 to 1.5 weight percent of units derived from 3,3',5,5'-tetramethyl-4,4'-biphenol; preferably, wherein the poly(arylene) ether copolymer comprises repeating units derived from 2,6-dimethyl phenol and 2,2-bis(3,5-dimethyl-4-hydroxyphenyl)propane.

Aspect 15: A curable composition comprising the poly(arylene ether) copolymer of any of aspects 1 to 9; an auxiliary curable resin, a curable unsaturated monomer composition, or both; and optionally, a curing promoter; preferably wherein the auxiliary curable resin comprises an epoxy resin, a cyanate ester resin, a maleimide resin, a benzoxazine resin, a vinylbenzyl ether resin, an arylcyclobutene resin, a perfluorovinyl ether resin, oligomers or polymers with curable vinyl functionality, or a combination thereof, and the curable unsaturated monomer composition comprises a monofunctional styrenic compound, a monofunctional (meth)acrylic compound, a polyfunctional allylic compound, a polyfunctional (meth)acrylate, a polyfunctional (meth)acrylamide, a polyfunctional styrenic compound, or a combination thereof Aspect 16: The curable composition of aspect 15, comprising the poly(arylene ether) copolymer of any of aspects 1 to 9, an epoxy resin, a cyanate ester resin, or a combination thereof; and optionally a curing promoter, preferably, wherein the curing promoter comprises an anhydride or an amine.

Aspect 17: The curable composition of aspect 15 or 16, comprising the poly(arylene ether) copolymer, an epoxy resin, and optionally a curing promoter, preferably wherein the curing promoter, when present, comprises an anhydride.

Aspect 18: The curable composition of aspect 15 or 16, comprising the poly(arylene ether) copolymer, a cyanate ester resin, and optionally, a curing promoter, preferably wherein the curing promoter, when present, comprises an amine.

Aspect 19: A thermoset composition comprising a cured product of the composition of any of aspects 15 to 19.

Aspect 20: An article comprising the thermoset composition of aspect 19, preferably wherein the article is in the form of a composite, a foam, a fiber, a layer, a coating, an encapsulant, an adhesive, a sealant, a molded component, a prepreg, a casing, or a combination comprising at least one of the foregoing.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. The term "combination thereof" as used herein includes one or more of the listed elements, and is open, allowing the presence of one or more like elements not named. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl), a thiol (—SH), a thiocyano (—SCN), a tosyl(CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A poly(arylene ether) copolymer,
wherein the poly(arylene ether) copolymer is the product of oxidative copolymerization of monomers comprising a monohydric phenol comprising 2,6-dimethylphenol and a dihydric phenol comprising 2,2-bis(3,5-dimethyl-4-hydroxyphenyl)propane,
wherein the poly(arylene ether) copolymer comprises less than or equal to 0.1 weight percent of incorporated amine groups and
wherein the poly(arylene ether) copolymer comprises less than 150 parts per million by weight of residual 2,6-dimethylphenol and less than 1 weight percent of residual 2,2-bis(3,5-dimethyl-4-hydroxyphenyl)propane, each as measured by gas chromatograph.

2. The poly(arylene ether) copolymer of claim 1, wherein the monomers further comprise 2 methylphenol, 2,5-dimethylphenol, 2,3,6-trimethyl phenol, or a combination thereof.

3. The poly(arylene ether) copolymer of claim 1, wherein the poly(arylene ether) copolymer has a number average molecular weight of 500 to 2,500 grams per mole and a weight average molecular weight of 1,000 to 6,000 grams per mole, wherein number average molecular weight and weight average molecular weight are as determined by gel permeation chromatography.

4. The poly(arylene ether) copolymer of claim 1, wherein the oxidative copolymerization is in the presence of a catalyst composition comprising di-n-butylamine; and wherein the poly(arylene ether) copolymer comprises less than or equal to 0.1 weight percent of incorporated dibutylamine groups.

5. The poly(arylene ether) copolymer of claim 1, wherein the oxidative copolymerization is in the presence of a catalyst composition excluding di-n-butylamine; and
wherein the poly(arylene ether) copolymer is devoid of incorporated dibutylamine groups.

6. The poly(arylene ether) copolymer of claim 1, wherein the poly(arylene ether) copolymer has an intrinsic viscosity is 0.04 to 0.15 deciliter per gram measured at 25° C. in chloroform.

7. The poly(arylene ether) copolymer of claim 1, wherein the poly(arylene ether) copolymer has an average of 1.8 to 2 hydroxyl groups per molecule.

8. A method of making a poly(arylene ether) copolymer, the method comprising:
oxidatively copolymerizing a monohydric phenol comprising 2,6-dimethyl phenol and a dihydric phenol comprising 2,2-bis(3,5-dimethyl-4-hydroxyphenyl) propane in a solvent in the presence of a catalyst composition comprising
a metal source;
0.18 to 0.40 weight percent of a secondary alkylene diamine ligand;
0 to 0.2 weight percent of a secondary monoamine; and
a tertiary monoamine;
wherein weight percent of each component of the catalyst composition is based on the total weight of the monohydric phenol and the dihydric phenol;
to form the poly(arylene ether) copolymer,
wherein the poly(arylene ether) copolymer comprises less than 150 parts per million by weight of residual 2,6-dimethylphenol and less than 1 weight percent of residual 2,2-bis(3,5-dimethyl-4-hydroxyphenyl)propane, each as measured by gas chromatograph.

9. The method of claim 8, wherein the catalyst composition comprises 0.05 to 0.15 weight percent di-n-butylamine;

and wherein the poly(arylene ether) copolymer comprises 0.01 to 0.1 weight percent of incorporated dibutylamine groups.

10. The method of claim 8, wherein the catalyst composition excludes a secondary monoamine and the poly(arylene ether) copolymer is devoid of incorporated amine groups.

11. The poly(arylene ether) copolymer made by the method of claim 8, wherein the poly(arylene ether) copolymer has
- a number average molecular weight of 500 to 2,500 grams per mole and a weight average molecular weight of 1,000 to 6,000 grams per mole, wherein number average molecular weight and weight average molecular weight are as determined by gel permeation chromatography;
- an intrinsic viscosity is 0.04 to 0.15 deciliter per gram measured at 25° C. in chloroform;
- less than or equal to 0.1 weight percent of incorporated dibutylamine groups.

12. A curable composition comprising
the poly(arylene ether) copolymer of claim 1;
an auxiliary curable resin, a curable unsaturated monomer composition, or both; and
optionally, a curing promoter.

13. The curable composition of claim 12, comprising
the poly(arylene ether) copolymer of claim 1,
an epoxy resin, a cyanate ester resin, or a combination thereof; and
optionally a curing promoter.

14. A thermoset composition comprising a cured product of the composition of claim 12.

15. An article comprising the thermoset composition of claim 14.

16. The poly(arylene ether) copolymer of claim 1, wherein the poly(arylene ether) copolymer comprises residual 2,6-dimethylphenol in an amount of 50 ppm or less as measured by gas chromatography.

17. The method of claim 8, wherein up to 3 weight percent of the tertiary monoamine is present.

18. The article of claim 15, wherein the article is in the form of a composite, a foam, a fiber, a layer, a coating, an encapsulant, an adhesive, a sealant, a molded component, a prepreg, a casing, or a combination comprising at least one of the foregoing.

19. The poly(arylene ether) copolymer of claim 1, wherein monomers further comprise a dihydric phenol different from 2,2-bis(3,5-dimethyl-4-hydroxyphenyl)propane, wherein the dihydric phenol has the formula

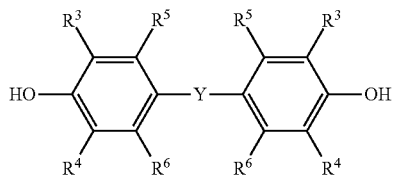

wherein $R^3$ and $R^4$ and $R^5$ and $R^6$ are independently at each occurrence hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and Y has a structure

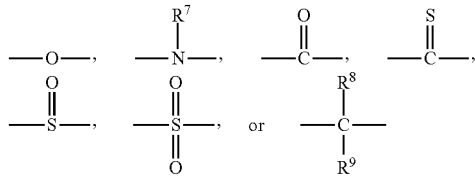

wherein each occurrence of $R^7$ is independently hydrogen or $C_{1-12}$ hydrocarbyl, and each occurrence of $R^8$ and $R^9$ is hydrogen, $C_1$-12 hydrocarbyl, or $C_{1-6}$ hydrocarbylene wherein $R^8$ and $R^9$ collectively form a $C_{4-12}$ cycloalkylene group.

* * * * *